TUNING ARRANGEMENT FOR RADIO TRANSMITTER

Filed Feb. 8, 1965

3,351,860
Patented Nov. 7, 1967

3,351,860

TUNING ARRANGEMENT FOR RADIO TRANSMITTER

Heinz Siegfried Wolff, Hampstead, London, England, assignor to National Research Development Corporation, London, England, a British corporation Filed Feb. 8, 1965, Ser. No. 430,971
Claims priority, application Great Britain, Feb. 14, 1964, 6,220/64
6 Claims. (Cl. 325—173)

ABSTRACT OF THE DISCLOSURE

In a radio transmitter, a radio frequency generator is coupled to an aerial circuit by a reactive network, and there is provided an automatic tuning arrangement for tuning the combination of the reactive network and the aerial circuit to a predetermined frequency approaching, but slightly different from, the generator frequency. A control signal is derived from a uni-directional voltage the magnitude of which represents the power flow in the reactive network and the control signal is applied to control the inductance of a variable inductor in the reactive network to tune the network to the required frequency.

This invention relates to automatic tuning arrangements for a radio transmitter.

Radio transmitters which work into aerials that are short compared with the wave length at which they are operating have to contain a matching network which allows the aerial to be made resonant at the operating frequency. Such a matching network can take the form of a loading coil, that is an inductance in series with the aerial which resonates with the aerial capacity. If the aerial is very short (such is the case for instance in 500 kc./s. life-raft transmitters which have to work into a 20 ft. aerial), then this inductance not only has to be of very high quality so as to minimise the losses within it, but because of its consequently high Q it has to be adjusted with great care. With a life-raft transmitter the untrained survivor under survival conditions might forget, or be unable, to tune the network accurately, and furthermore under life-raft conditions there are a number of factors such as movement of the aerial when the raft is in a seaway which continually produce minor changes in aerial capacitance thus throwing the system off tune and greatly reducing the radiated power.

The present invention provides an automatic tuning arrangement for a radio transmitter which includes a radio frequency generator and an aerial circuit, said arrangement comprising a reactive network connected between said radio frequency generator and said aerial circuit, said reactive network including an inductance element the inductance of which is dependent upon a control signal applied to said inductance element, means for deriving a uni-directional voltage the magnitude of which is representative of the magnitude of power flow in said reactive network, generating means for generating a uni-directional reference voltage, a comparator circuit connected to compare said power representative voltage with said reference voltage to provide as said control signal a difference signal representative of the difference between the magnitudes of said voltages, means for applying said control signal to said inductance element, said control signal operating to control said inductance of said inductance element to maintain the combination of said reactive network and said aerial circuit tuned to a predetermined frequency approaching, but differing slightly from, the frequency of said radio frequency generator, whereby the power flowing in said reactive network is maintained close to the maximum power available.

The controlled inductor conveniently comprises a ferrite pot core with an axial hole round which the main coil is wound, a control coil being wound toroidally around the core and through the axial hole. Current passed through the control coil then modifies the effective permeability of the core material and changes the value of the inductance presented by the main coil to an extent dependent on the value of the control current.

An embodiment of the invention will now be described, by way of example, with reference to the drawings accompanying this specification, in which.

Figures 1, 3:
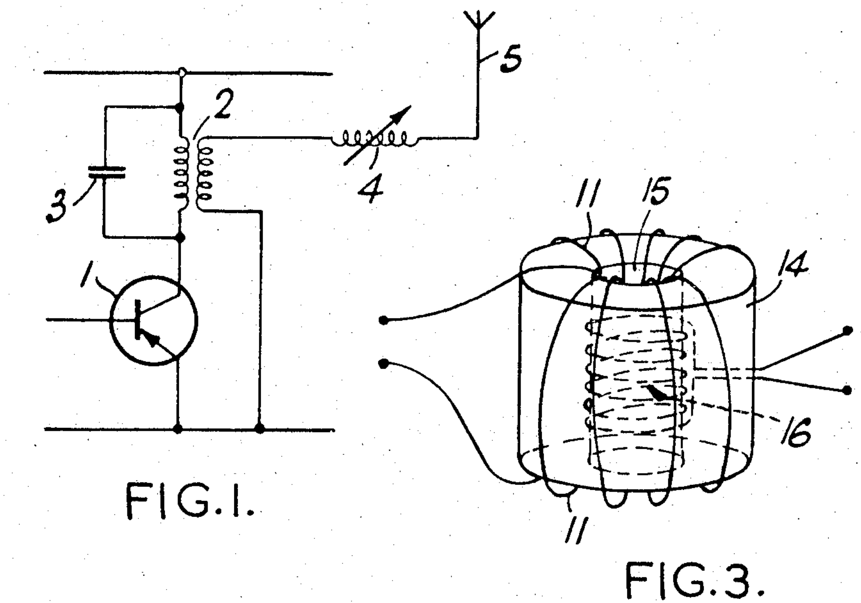
FIGURE 1 shows a power amplifier and aerial circuit of a typical small radio transmitter.
FIGURE 3 shows a ferrite pot core inductor.

In FIGURE 1 the power amplifier stage of a small transmitter comprises essentially a transistor 1 which feeds a transformer 2 the primary winding of which forms with a capacitor 3 a parallel tuned circuit tuned to the transmitter frequency. The output winding of transformer 2 feeds a simple reactive resonant network including the inductance of the secondary winding of transformer 2, the inductance of a loading coil 4 and the capacitance of an aerial 5. Where the aerial is short the capacitance it presents can vary widely with external conditions and hence frequent and accurate tuning of the loading coil 4 becomes necessary to maintain the network in tune.

Figure 2:
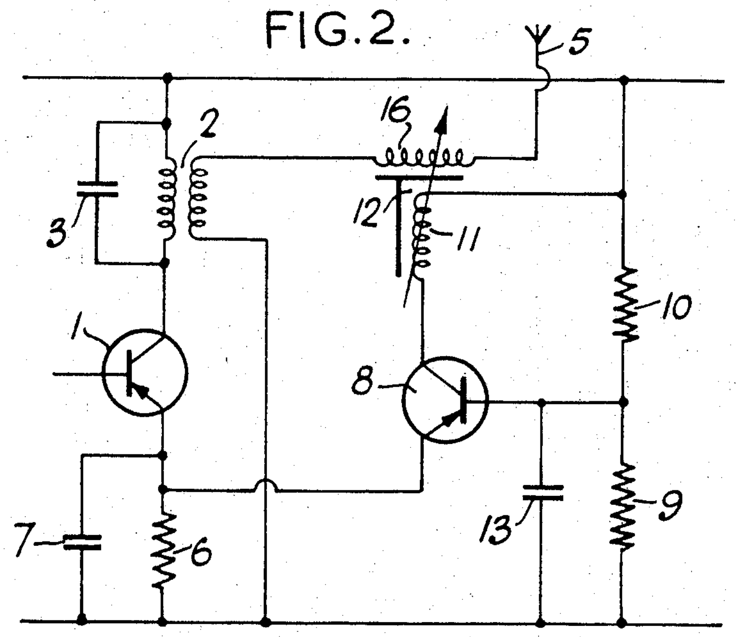
FIGURE 2 shows a similar circuit as FIGURE 1 but embodying the invention.

FIGURE 2 shows the circuit of FIGURE 1, like parts having like reference numerals, together with an arrangement for maintaining the aerial network closely in tune. A resistor 6 decoupled by capacitor 7 is connected in the emitter lead of transistor 1 and the voltage appearing across this resistor is used as the input to the emitter of a transistor 8. The base potential of transistor 8 is held constant by a potential divider comprising the resistors 9, 10. The collector of transistor 8 is connected to the control winding 11 of the current controlled inductor 12 the main coil 16 of which replaces the loading coil 4 of FIGURE 1 in the aerial circuit. A capacitor 13 is connected between the base of transistor 8 and earth to delay the build up of current through coil 11 while the oscillations in the main aerial circuit are built up after the transmitter is switched on.

FIGURE 3 shows in more detail the construction of the current controlled inductor 12. The inductor comprises a ferrite pot core 14 with an axial hole 15 around which the main aerial loading coil 16 is wound. The control coil 11 is wound toroidally around the core and through the axial hole 15. Current passed through the control coil modifies the effective permeability of the core material in the sense that as the value of the control current increases, the inductance presented by the main coil 16 decreases and vice versa.

With the arrangement described above the current flowing through resistor 6 and hence the voltage across it gives a measure of the power radiated by aerial 5. This voltage is compared in transistor 8 with a fixed reference potential provided by the potential divider chain 9 and 10 to obtain a collector current which flows through the control coil 11 of the inductor 12 to determine the value of the inductance of winding 16.

In practice the inductance of the aerial loading coil 16 is chosen so that when a low current passes through control coil 11 the coil 16 resonates at the desired signal frequency with a capacitance which is slightly below the minimum aerial capacitance expected. In operation the capacitance of the aerial is normally greater than this value so that for a low value of control current the aerial loading circuit is off tune, reducing the current flowing through resistor 6 and resulting in an increase in the control current through control coil 11. Thus the inductance of aerial loading coil 16 becomes reduced to cause the resonant frequency of the aerial loading circuit to increase towards its optimum value and thus increase the magnitude of the R.F. power radiated. Accordingly the system is held on the correct side of its tuning curve and stability is maintained. When the transmitter is operating near optimum performance, the aerial network is therefore tuned to a frequency closely below the desired signal frequency. The value of the current flowing through the decoupled emitter resistor 6 is near a maximum and a correspondingly high voltage is established across resistor 6.

When for any reason the aerial capacitance changes, the current taken through transformer 2 from transistor 1 changes and hence the voltage appearing across resistor 6 changes. This change is communicated as a change in the current through coil 11 causing a change in inductance of coil 16 in a direction to maintain constant the resonant frequency of the aerial loading circuit.

The value of resistor 6 is chosen such that transistor 8 can be driven from saturation to cut-off for a small change in the current through resistor 6 or transistor 1. In this way high sensitivity is achieved. If, on switching the transmitter on, it were to take some time for the oscillator to warm up, then transistor 8 might well be driven into saturation before any oscillations had built up. The system would then be on the wrong side of the tuning curve and unable to gain control. To avoid this, capacitor 13 is connected between the base of transistor 8 and earth to delay the build up of current through the control coil 11.

In other embodiments of the invention, the first voltage, representative of the power flow, may be obtained from other sources in the network. For example, a portion of the radio frequency output of the aerial network could be tapped off, rectified, and compared with a preset reference voltage, as before.

I claim:

1. An automatic tuning arrangement for a radio transmitter which includes a radio frequency generator and an aerial circuit, said arrangement comprising:
- a reactive network connected between said radio frequency generator and said aerial circuit, said reactive network including an inductance element the inductance of which is dependent upon a control signal applied to said inductance element;
- means for deriving a uni-directional voltage the magnitude of which is representative of the magnitude of power flow in said reactive network;
- generating means for generating a uni-directional reference voltage;
- a comparator circuit connected to compare said power representative voltage with said reference voltage to provide as said control signal a difference signal representative of the difference between the magnitudes of said voltages;
- means for applying said control signal to control said inductance of said inductance element to maintain the combination of said reactive network and said aerial circuit tuned to a predetermined frequency approaching, but differing slightly from, the frequency of said radio frequency generator, whereby the power flowing in said reactive network is maintained close to the maximum power available.

2. An arrangement according to claim 1, wherein said reactive network has a resonant peak at a frequency approaching, but slightly less than, that of said radio frequency generator, and said means for applying said control signal are connected to apply said control signal in a sense such that in response to any increase in power flow in said reactive network above a predetermined value said control signal increases the inductance of said inductance element and in response to any decrease in power flow in said reactive network below said predetermined value said control signal decreases said inductance.

3. An arrangement as claimed in claim 1, wherein said inductor comprises a core having a main winding and a control winding, said main winding being connected in the reactive network and said control winding being connected for energization with said applied control signal, the core being constructed of material whose effective permeability is dependent on the magnitude of said applied control signal and said core being a generally annularly shaped ferrite core defining a central bore, the main winding of which is wound concentrically of the bore, and the control winding of which is wound around the core as a generally toroidal winding.

4. The arrangement as claimed in claim 1 wherein said inductor comprises a core having a main winding and a control winding, said main winding being connected in the reactive network and said control winding being connected for energisation with said applied control signal, the core being constructed of material whose effective permeability is dependent on the magnitude of said applied control signal.

5. A radio transmitter including:
- an amplifier;
- an aerial circuit;
- a reactive network connected between said amplifier and said aerial circuit, said amplifier operating to supply an output signal of predetermined frequency from said amplifier to said aerial circuit, said reactive network having a resonant peak at a frequency approaching, but differing slightly from, that of the output signal;
- a resistor connected in said amplifier so that a unidirectional voltage appearing between the ends of said resistor is representative of the magnitude of the power supplied to the reactive network;
- a reference circuit for providing a reference voltage;
- a comparator connected and arranged to compare the magnitude of said representative voltage with the magnitude of said reference voltage and to derive therefrom a control current representative of the difference between the magnitudes of said voltages; and
- a current control led inductor having a main winding and a control winding, the main winding being connected in said reactive network and the control winding being connected for supply by said control current, said control current operating to respond to any change in power flow in the reactive network from a predetermined value by varying the inductance of the inductor to tend to maintain the combination of said reactive network and said aerial circuit tuned to a predetermined frequency approaching, but differing slightly from, the frequency of said output signal, whereby the power flowing in said reactive network is maintained close the maximum power available.

6. A radio transmitter according to claim 5, wherein said reactive network has a resonant peak at a frequency approaching, but slightly greater than, that of said output signal and said means for applying said control signal connected to apply said control signal in a sense such that in response to any increase in power flow in said reactive network above a predetermined value said control signal decreases the inductance of said inductor, and in response to any decrease in power flow in said reactive network below said predetermined value said control signal increases said inductance.

References Cited

UNITED STATES PATENTS

| | | | |
|---|---|---|---|
| 1,775,210 | 9/1930 | Osnos | 325—173 X |
| 2,870,334 | 1/1959 | Crofts | 334—12 |
| 2,882,392 | 4/1959 | Sands | 336—155 X |
| 3,188,568 | 6/1965 | Monachesi | 325—173 |
| 3,218,547 | 11/1965 | Ling | 336—229 X |
| 3,255,414 | 6/1966 | Kawalek et al. | 325—173 |

JOHN W. CALDWELL, *Primary Examiner.*